(12) United States Patent
Allen

(10) Patent No.: US 8,356,522 B2
(45) Date of Patent: Jan. 22, 2013

(54) ULTRASONIC FLOW METER WITH A LIQUID DRAINAGE SYSTEM

(75) Inventor: Charles Robert Allen, Houston, TX (US)

(73) Assignee: Daniel Measurement and Control, Inc., Houston, TX (US)

( * ) Notice: Subject to any disclaimer, the term of this patent is extended or adjusted under 35 U.S.C. 154(b) by 192 days.

(21) Appl. No.: 13/069,092

(22) Filed: Mar. 22, 2011

(65) Prior Publication Data

US 2012/0067135 A1    Mar. 22, 2012

Related U.S. Application Data

(60) Provisional application No. 61/317,313, filed on Mar. 25, 2010.

(51) Int. Cl.
*G01F 1/66* (2006.01)
(52) U.S. Cl. .................................................. 73/861.28
(58) Field of Classification Search .................. 73/1.35, 73/861.18, 861.28
See application file for complete search history.

(56) References Cited

U.S. PATENT DOCUMENTS

| | | | |
|---|---|---|---|
| 2005/0044951 A1 | 3/2005 | Forshey et al. | |
| 2008/0250869 A1* | 10/2008 | Breed et al. | 73/861.27 |
| 2012/0125122 A1* | 5/2012 | Gottlieb et al. | 73/861.28 |
| 2012/0204620 A1* | 8/2012 | Straub, Jr. | 73/1.35 |

FOREIGN PATENT DOCUMENTS

| | | |
|---|---|---|
| JP | 2008227658 A | 9/2008 |
| KR | 20050045002 A | 5/2005 |
| KR | 20080112739 A | 12/2008 |

OTHER PUBLICATIONS

PCT/US2011/029414 International Search Report and Written Opinion, Nov. 11, 2011 (8 p.).

* cited by examiner

*Primary Examiner* — Jewel V Thompson
(74) *Attorney, Agent, or Firm* — Conley Rose, P.C.

(57) ABSTRACT

An ultrasonic flow meter for measuring the flow of a fluid through a pipeline comprises a spool piece including a throughbore and a transducer port. The transducer port extends along a central axis from an open end at the throughbore to a closed end distal the throughbore. In addition, the flow meter comprises an acoustic transducer disposed in the transducer port. The transducer includes a piezoelectric element. Further, the flow meter comprises a drain port in fluid communication with the transducer port. The drain port is axially positioned between the open end and the closed end of the transducer port. Still further, the flow meter comprises a drain conduit having an inlet end coupled to the drain port and an outlet end opposite the inlet end. The drain port is configured to drain a liquid from the transducer port into the inlet end of the drain conduit.

20 Claims, 8 Drawing Sheets

ULTRASONIC FLOW METER WITH A LIQUID DRAINAGE SYSTEM

CROSS-REFERENCE TO RELATED APPLICATIONS

This application claims benefit of U.S. provisional patent application Ser. No. 61/317,313 filed Mar. 25, 2010, and entitled "Ultrasonic Flow Meter with a Liquid Drainage System," which is hereby incorporated herein by reference in its entirety.

STATEMENT REGARDING FEDERALLY SPONSORED RESEARCH OR DEVELOPMENT

Not applicable.

BACKGROUND

1. Field of the Invention

The invention relates generally to ultrasonic flow meters. More particularly, the invention relates to liquid drainage systems for ultrasonic flow meters.

2. Background of the Technology

After hydrocarbons have been removed from the ground, the fluid stream (either in a liquid phase or a gaseous phase) is transported from place to place via pipelines. It is desirable to know with accuracy the amount of fluid flowing in the stream, and particular accuracy is demanded when the fluid is changing hands, or during "custody transfer." Even where custody transfer is not taking place, however, fluid flow rate measurement accuracy is desirable, and in these situations ultrasonic flow meters may be used.

An ultrasonic flow meter includes two or more transducer assemblies, each secured inside of a port in the body of the flow meter. The body of the flow meter may also be referred to as a spool piece. To contain the transported fluid within the flow meter, a connector is secured over the exterior end of each transducer port in the spool piece. Thus, the spool piece and end connectors create a pressure boundary and housing that contains the fluid flowing through the meter.

To measure fluid flow through the meter, a pair of transducer assemblies is positioned along the inner surface of the spool piece, such that each transducer assembly faces the other on opposite sides of the fluid flow through the bore of the spool piece. Each transducer assembly includes a piezoelectric element. When an alternating current is applied to the piezoelectric element of the first transducer assembly of the pair, the piezoelectric element responds by radiating an ultrasonic wave through the fluid flowing through the flow meter. When the wave is incident upon the piezoelectric element of the second transducer assembly of the pair, the second transducer assembly responds by generating an electric signal. Some time later, an alternating current is applied to the piezoelectric element of the second transducer assembly, and the second piezoelectric element responds by radiating an ultrasonic wave through the fluid in the flow meter to the first transducer assembly. When the wave is incident upon the piezoelectric element of the first transducer assembly, that transducer assembly responds by generating an electric signal. In this way, the transducer assemblies transmit and receive signals back-and-forth across the fluid stream.

Each transducer assembly is connected to a cable that extends through the end connector to the exterior of the spool piece and a remote location, such as an electronics base enclosure typically mounted to the outside of the spool piece. The cable carries the electric signal created by the piezoelectric element of the particular transducer assembly to an acquisition board positioned within the electronics base enclosure, where the signal may be processed and subsequently used to determine the fluid flow rate through the meter.

In most applications, it is common to have relatively small amounts of liquids in the gas stream flowing through the flow meter. Over time, some of the liquid may collect or accumulate within the transducer ports. However, the accumulation of an excessive amount liquid within the transducer port can detrimentally affect the transmission and/or receipt of signals by the transducer assembly disposed in the port. In particular, the accumulated liquid may cause the acoustic signal from the transducer assembly disposed in the port to acoustically short. In other words, the acoustic signal generated by the transducer assembly may pass into the liquid and/or meter body instead of passing exclusively through the fluid flowing through the meter body to the mating transducer assembly. As a result, the acoustic signal will not arrive at the mating transducer assembly, thereby causing flow measurement errors. In addition, accumulation of liquid in the transducer port may also cause shorting or corrosion of wires or other electrical components of the transducer assembly, potentially leading to failure of the transducer assembly.

To minimize the accumulation of fluids in transducer ports and associated problems, ultrasonic flow meters are typically mounted in specific orientations that allow accumulated liquid in the transducer ports to self drain, under the force of gravity, back into the main flow bore of the meter body. For example, ultrasonic flow meters employing transducer signal paths that cross the flow bore of the flow meter between a pair of transducer assemblies are typically recommended to be installed in horizontal piping (i.e., in-line with a horizontal section of piping) and positioned such that the transducer ports are oriented horizontally. The horizontal orientation of the transducer ports allows an liquid that has accumulated in the ports to self drain, under the force of gravity, back into the main flow bore of the meter body as long as the diameter of the port is uniform along its length or the diameter of the port increases moving towards the main flow bore of the meter body. As another example, ultrasonic flow meters employing transducer paths that bounce off the inner surface of the flow meter are typically recommended to be installed in horizontal piping (i.e., in-line with a horizontal section of piping) with the transducer port(s) positioned on the upper side of the flow meter and oriented vertically or at an angle less than 90° from vertical. The vertical or near vertical orientation of the transducer port(s) on the upper side of the meter body allows any liquid that has accumulated in the ports to self drain downward, under the force of gravity, back into the main flow bore of the meter body.

In the manner previously described, to reduce the accumulation of liquids in the transducer ports, flow meters and associated transducer ports are typically positioned and oriented in a specific manner. As a result, placement of the flow meter along a pipeline may be limited to those specific locations where the pipeline is horizontal. However, in some applications, it may not be possible, convenient, or cost effective to orient the flow meter as recommended. Accordingly, there remains a need in the art for ultrasonic flow meters that can be mounted in a greater variety of positions and orientations, while minimizing the accumulation of liquid in one or more of the transducer ports.

BRIEF SUMMARY OF THE DISCLOSURE

These and other needs in the art are addressed in one embodiment by an ultrasonic flow meter for measuring the flow of a fluid through a pipeline. In an embodiment, the flow meter comprises a spool piece including a throughbore and a transducer port. The transducer port extends along a central axis from an open end at the throughbore to a closed end distal the throughbore. In addition, the flow meter comprises an acoustic transducer disposed in the transducer port. The transducer includes a piezoelectric element. Further, the flow meter comprises a drain port in fluid communication with the transducer port. The drain port is axially positioned between the open end and the closed end of the transducer port. Still further, the flow meter comprises a drain conduit having an inlet end coupled to the drain port and an outlet end opposite the inlet end. The drain port is configured to drain a liquid from the transducer port into the inlet end of the drain conduit.

These and other needs in the art are addressed in another embodiment by a method for draining an accumulated liquid from a transducer port of an ultrasonic flow meter. In an embodiment, the method comprises (a) flowing a fluid through a throughbore in the flow meter. The transducer port extends from the throughbore and is in fluid communication with the throughbore. In addition, the method comprises (b) communicating an acoustic signal across a throughbore of the flow meter with a transducer disposed in the transducer port. Further, the method comprises (c) accumulating a liquid in the transducer port during (a). Still further, the method comprises (d) draining the accumulated liquid in the transducer port through a drain port in fluid communication with the transducer port after (c). Moreover, the method comprises (e) flowing the liquid from the drain port into a drain conduit during (d). In addition, the method comprises (f) biasing a valve in the drain conduit to a closed position restricting the liquid from flowing through the valve. The method also comprises (g) transitioning the valve to an open position after (c) to allow the liquid to flow through the valve.

These and other needs in the art are addressed in another embodiment by a method for identifying a malfunctioning acoustic transducer in an ultrasonic flow meter. In an embodiment, the method comprises (a) flowing a fluid through a throughbore of the flow meter. In addition, the method comprises (b) sending an acoustic signal across a throughbore of the flow meter with an acoustic transducer disposed in a transducer port extending from a throughbore in the flow meter. Further, the method comprises (c) receiving an acoustic signal passing across the throughbore of the flow meter with the acoustic transducer. Still further, the method comprises (d) providing a drain port in fluid communication with the transducer port. A drain conduit coupled to the drain port includes a valve. Moreover, the method comprises (e) continuously monitoring the acoustic signals with an electronics package coupled to the transducer. In addition, the method comprises (f) determining the validity of the acoustic signals with the electronics package during (e). Further, the method comprises (g) maintaining the valve in the closed position with the electronics package when the acoustic signal is determined to be valid in (f). The method also comprises (h) transitioning the valve to the open position in (g) with the electronics package when the acoustic signal is determined to be invalid in (f).

Thus, embodiments described herein comprise a combination of features and advantages intended to address various shortcomings associated with certain prior devices, systems, and methods. The various characteristics described above, as well as other features, will be readily apparent to those skilled in the art upon reading the following detailed description, and by referring to the accompanying drawings.

BRIEF DESCRIPTION OF THE DRAWINGS

For a detailed description of exemplary embodiments of the invention, reference will now be made to the accompanying drawings in which.

DETAILED DESCRIPTION OF THE PREFERRED EMBODIMENTS

Figure 1A:
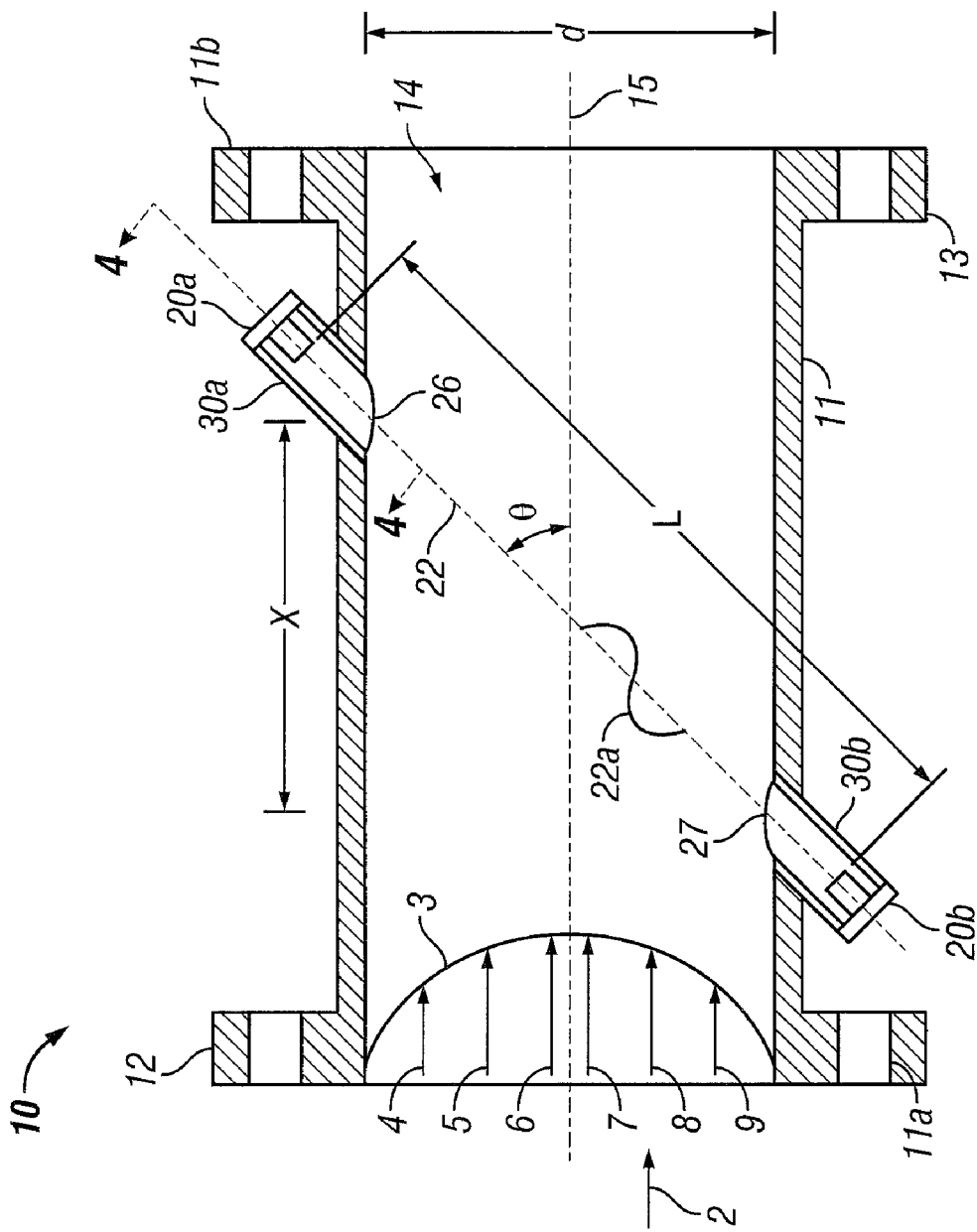
FIG. 1 is a cross-sectional top view of an embodiment of an ultrasonic flow meter taken along line 1-1 of FIG. 2.

The following discussion is directed to various embodiments of the invention. Although one or more of these embodiments may be presently preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

Figure 2:
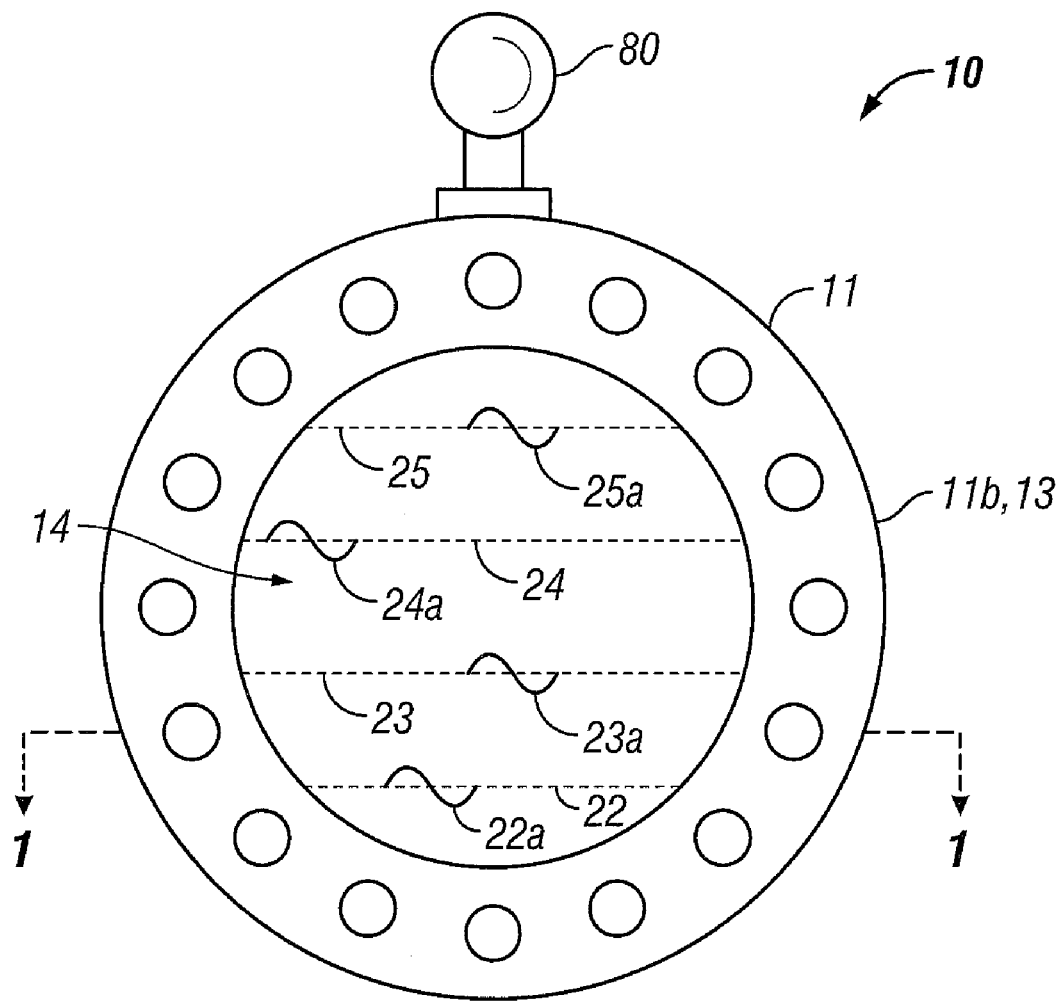
FIG. 2 is an end view of the flow meter of FIG. 1 schematically illustrating the acoustic signal paths and corresponding acoustic signals generated and received by the transducer assemblies of FIGS. 1 and 3.
Figure 3:
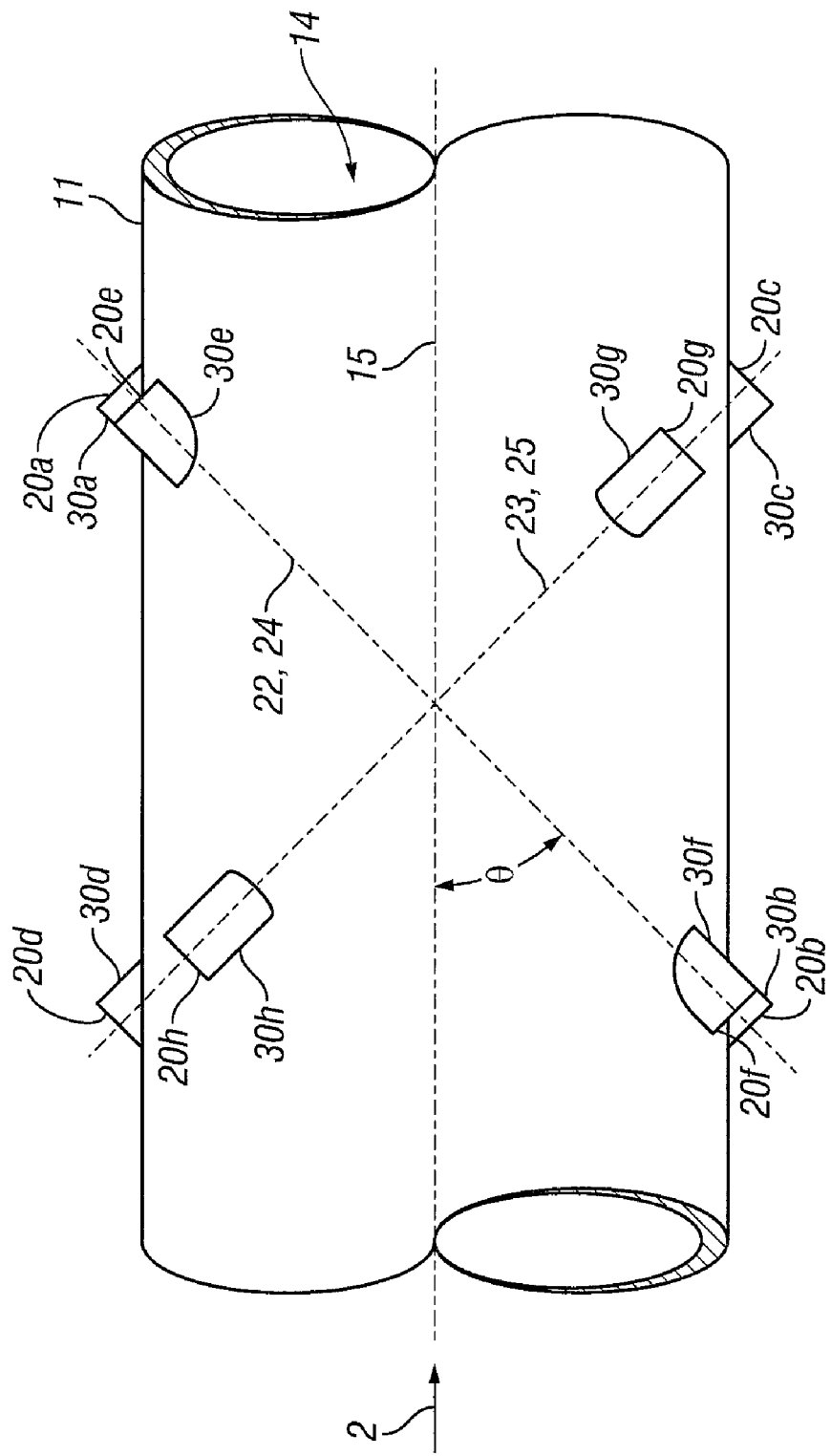
FIG. 3 is a schematic top view of the flow meter of FIG. 1.

Referring now to FIGS. 1-3, schematic views of an embodiment of an ultrasonic flow meter 10 is shown. Meter 10 includes a meter body or spool piece 11 suitable for placement between sections of a pipeline. Spool piece 11 extends along a central axis 15 between a first or upstream end 11a and a second or downstream end 11b opposite first end 11a. As best shown in FIGS. 1 and 2, in this embodiment, each end 11a, b each comprises a mounting flange 12, 13, respectively. In addition, spool piece 11 has a predetermined size and defines a central through passage 14 extending between ends 11a, b and through which a measured fluid (e.g., gas and/or liquid) flows.

As shown in FIGS. 2 and 3, in this embodiment, meter 10 includes four pairs of transducers disposed in transducer ports positioned along the length of spool piece 11—a first pair of transducers 20a, 20b disposed in transducer ports 30a, 30b, respectively, a second pair of transducers 20c, 20d disposed in transducer ports 30c, 30d, respectively, a third pair of transducers 20e, 20f disposed in transducer ports 30e, 30f, and a fourth pair of transducers 20g, 20h disposed in transducer ports 30g, 30h, respectively.

Each transducer (e.g., transducer 20a, 20b, 20c, 20d, 20e, 20f, 20g, 20h) is an acoustic transceiver, and more particularly an ultrasonic transceiver, meaning each generates and receives acoustic energy having frequencies of above about 20 kilohertz. The acoustic energy may be generated and received by a piezoelectric element in each transducer. To generate an acoustic signal, the piezoelectric element is stimulated electrically by way of a sinusoidal signal, and it responds by vibrating. The vibration of the piezoelectric element generates the acoustic signal that travels through the measured fluid to the corresponding transducer of the transducer pair. Similarly, upon being struck by acoustic energy (i.e., the acoustic signal and other noise signals), the receiving piezoelectric element vibrates and generates a sinusoidal electrical signal that is detected, digitized, and analyzed by electronics associated with the meter.

The transducers of each pair of transducers are disposed opposite each other across through passage 14 and communicate acoustic signals back-and-forth to each other. Specifically, transducers 20a, 20b are disposed opposite each other across through passage 14 and communicate acoustic signals back-and-forth to each other; transducers 20c, 20d are disposed opposite each other across through passage 14 and communicate acoustic signals back-and-forth to each other; transducers 20e, 20f are disposed opposite each other across through passage 14 and communicate acoustic signals back-and-forth to each other; and transducers 20g, 20h are disposed opposite each other across through passage 14 and communicate acoustic signals back-and-forth to each other. An acoustic signal path 22, 23, 24, 25, sometimes referred to as a "chord" or "chordal path," exists between each pair of opposed transducers 20a, 20b; 20c, 20d; 20e, 20f; and 20g, 20h, respectively.

Each pair of transducers and associated transducer ports corresponds to a single chordal path. Each chordal path 22, 23, 24, 25 loosely forms the shape of an "X" with respect to a different chordal path 22, 23, 24, 25 in top view. As best shown in FIG. 2, each pair of transducers and its corresponding chordal path 22, 23, 24, 25 is disposed at a different "level" in spool piece 11. Taking FIGS. 2 and 3 together, the pairs of transducers are arranged such that the lower two pairs of transducers 20a, 20b and 20c, 20d corresponding to chords 22 and 23, respectively, form the shape of an "X" in top view, and the upper two pairs of transducers 20e, 20f and 20g, 20h corresponding to chords 24 and 25, respectively, also form the shape of an "X".

Referring now to FIG. 1, the first pair of transducers 20a, 20b will be described in more detail, it being understood that each pair of transducers of flow meter 10 are similarly configured and arranged. Chord 22 is disposed at an acute angle θ relative to centerline 15 in top view. The length of chord 22 is the distance between the faces of corresponding pair of transducers 20a, 20b. As shown in the illustrative pair of transducers 20a, 20b in FIG. 1, points 26 and 27 define the locations where acoustic signals generated by transducers 20a, 20b, respectively, enter and leave fluid flowing through passage 14 of spool piece 11 (i.e., at the intersection of ports 30a, 30b and passage 14 of spool piece 11). The position of transducers 20a, 20b may be defined by the angle θ, by a first length L measured between transducers 20a, 20b, a second length X corresponding to the axial distance between points 26, 27, and a third length "d" corresponding to inner diameter of spool piece 11. In most cases, distances d, X and L are precisely determined during fabrication of the meter (e.g., meter 10). Further, the pair of transducers 20a, 20b are usually placed a specific distance from points 26, 27, respectively, regardless of meter size (i.e., spool piece size). A fluid, such as natural gas, flows in a direction 2 with a velocity profile 3. Velocity vectors 4-9 illustrate that the gas velocity through spool piece 11 increases toward the centerline 15. In many cases, the fluid flowing through passage 14 will include small amounts of liquid.

Referring still to the illustrative pair of transducers 20a, 20b shown in FIG. 1, initially, downstream transducer 20a generates an acoustic signal that propagates across the fluid in the spool piece 11, and is then incident upon and detected by upstream transducer 20b. A short time later (e.g., within a few milliseconds), the upstream transducer 20b generates a return acoustic signal that propagates back across the fluid in the spool piece 11, and is then incident upon and detected by the downstream transducer 20a. Thus, the transducers 20a, 20b play "pitch and catch" with acoustic signals 22a along chordal path 22. During operation, this sequence may occur thousands of times per minute.

The transit time of the acoustic signal 22a between transducers 20a, 20b depends in part upon whether the acoustic signal 22a is traveling upstream or downstream with respect to the fluid flow. The transit time for an acoustic signal traveling downstream (i.e., in the same direction as the fluid flow) is less than its transit time when traveling upstream (i.e., against the fluid flow). The upstream and downstream transit times can be used to calculate the average velocity along the signal path, and the speed of sound in the measured fluid.

In general, ultrasonic flow meters can have one or more acoustic signal paths. For example, as best shown in FIGS. 2 and 3, in this embodiment, ultrasonic flow meter 10 actually comprises four chordal paths 22, 23, 24, 25 and associated acoustic signals 22a, 23a, 24a, 25a, respectively, at varying levels within the spool piece 11. Each chordal path 22, 23, 24, 25 corresponds to a transducer pair behaving alternately as a transmitter and receiver similar to first transducer pair 20a, 20b previously described. Also shown in FIG. 2 is electronics control package or enclosure 80, which controls acoustic signal generation, and acquires and processes the data from the four chordal paths 22, 23, 24, 25. The flow velocity of the fluid may be determined at each chord 22, 23, 24, 25 to obtain chordal flow velocities, and the chordal flow velocities combined to determine an average flow velocity over the entire pipe. From the average flow velocity, the amount of fluid flowing in the spool piece, and thus the pipeline, may be determined.

As previously described, in many applications, the fluid flowing through an ultrasonic flow meter (e.g., meter 10) will include small amounts of liquid. Most conventional ultrasonic flow meters are mounted in a specific position and orientation to minimize liquid accumulation. In particular, most conventional ultrasonic flow meters are mounted such that any liquid that accumulates within each transducer port will automatically drain under the force of gravity back into the through passage in the meter. This typically requires orienting the flow meter such that each transducer port of the flow meter is horizontal, tilted downward as it extends from the exterior of the spool piece to the through passage of the meter, and/or positioned on the upper half of the flow meter. As a result, the potential sections along a pipeline at which the flow meter may be installed can be drastically limited. However, as will be described in more detail below, embodiments described herein include drain port(s) on one or more of the transducer ports susceptible to liquid accumulation and associated problems.

Figure 4:
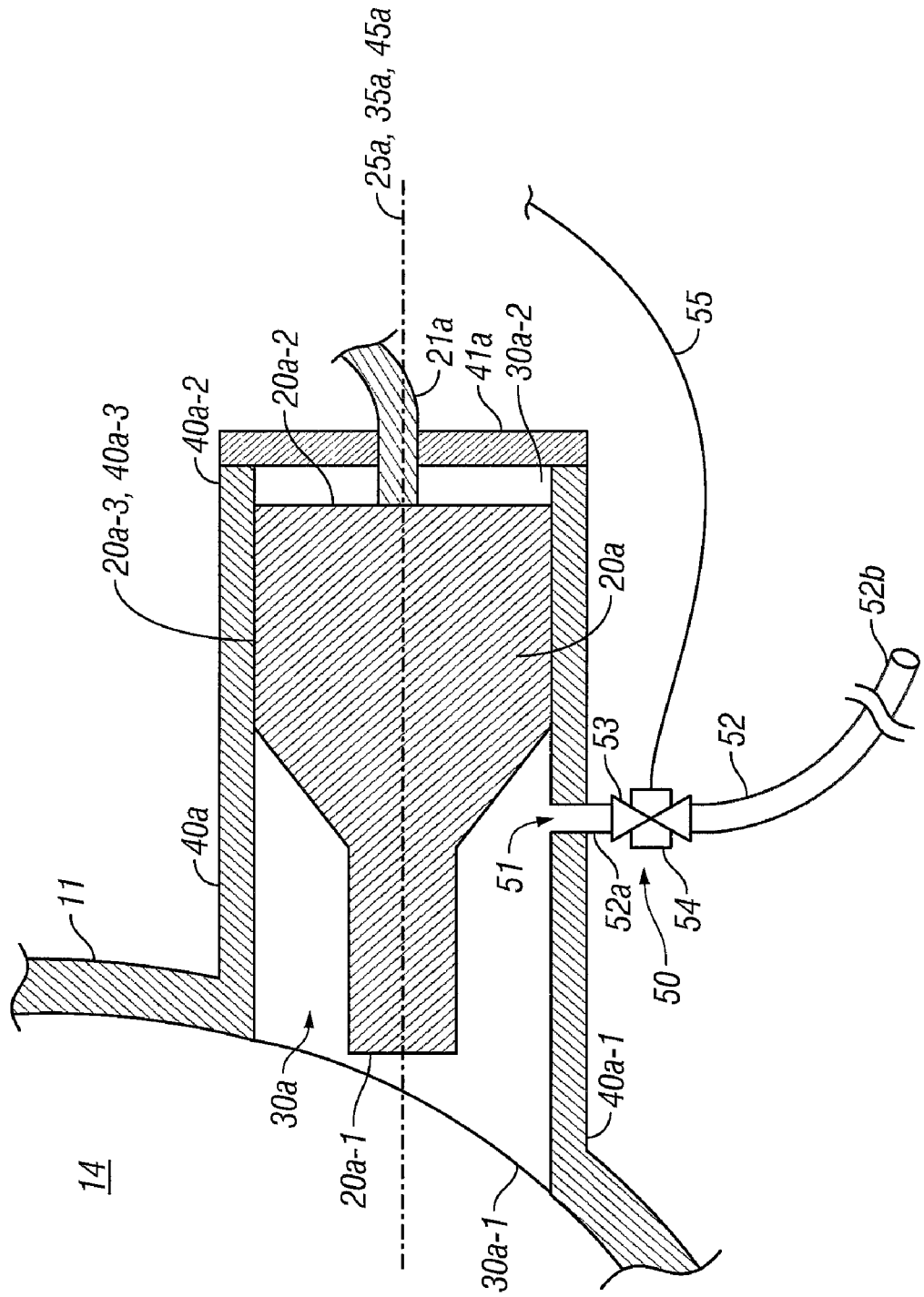
FIG. 4 is an enlarged partial cross-sectional of the flow meter of FIG. 1 taken along line 4-4 of FIG. 1 including an embodiment of a liquid drainage system.

Referring now to FIG. 4, a schematic cross-sectional view of spool piece 11 taken along line 4-4 of FIG. 1 through transducer port 30a and associated transducer 20a is shown. Although FIG. 4 only illustrates one transducer port (i.e., transducer port 30a) and its corresponding transducer (e.g., transducer 20a), one or more of the remaining transducer ports 30b, 30c, 30d, 30e, 30f, 30g, 30h may be configured the same, depending on the application and the anticipated liquid accumulation within each port 30b, 30c, 30d, 30e, 30f, 30g, 30h. In particular, based on the installation of flow meter 10 and the orientation of the transducer ports, each port susceptible to liquid accumulation is preferably configured the same as port 30a described below.

As shown in FIG. 4, port 30a is in fluid communication with passage 14 and extends along a central axis 35a from a first or open end 30a-1 at passage 14 and a second or closed end 30a-2 distal passage 14. In this embodiment, port 30a is defined by a transducer housing 40a extending from spool piece 11 along a central axis 45a between a first end 40a-1 proximal passage 14 and a second end 40a-2 distal passage 14. In this embodiment, first end 40a-1 of housing 40a is integral with spool piece 11. Port 30a defines a central bore or passage extending coaxially (relative to axes 25a, 35a) through transducer housing 40a between ends 40a-1, 40a-2. In other words, axis 35a of port 30a is coincident with axis 45a of port 40a. An end cap 41a is coupled to end 40a-2 and closes off second end 30a-2 of port 30a.

Referring still to FIG. 4, transducer 20a is coaxially disposed within transducer port 30a and transducer housing 40a, and removably coupled to housing 40a. In particular, transducer 20a extends along a central axis 25a between a first end 20a-1 proximal passage 14 of spool piece 11 and a second end 20a-2 distal passage 14. The piezoelectric element that generates and receives acoustic signal 22a along chord 22 previously described is disposed within transducer 20a proximal first end 20a-1. A cable 21a extends through end cap 41a and is electrically coupled to transducer 20a at second end 20a-2. Cable 21a communicates electrical signals and data between transducer 20a and the electronics package 80 previously described, which is coupled to the outside of spool piece 11.

In this embodiment, transducer 20a is releasably secured to housing 40a within port 30a with mating threads—transducer 20a includes external threads 20a-3 that engage internal threads 40a-3 of housing 40a. The threaded engagement between transducer 20a and housing 40a enables transducer 20a to be positioned within port 30a at the desired axial position relative to axes 25a, 35a, 45a, maintained within port 30a at the desired axial position relative to axes 25a, 35a, 45a, and removed from port 30a as desired for servicing and/or maintenance. Although mating threads 20a-3, 40a-3 are employed in this embodiment to releasably couple transducer 20a to housing 40a, in other embodiments, the transducer (e.g., transducer 20a) may be positioned within the housing (e.g., housing 40a) by any suitable means including, without limitation, interference fit, press fit, bolts, welded connection, or combinations thereof.

During operation of flow meter 10, the fluid flowing through passage 14 (represented by arrow 2 in FIG. 1) may include small amounts of liquid. Over time, some of the liquid may accumulate within port 30a. If port 30a and axis 35a are horizontal, the liquid will have a tendency to flow under the force of gravity towards open end 30a-1 and into meter passage 14 as the depth of liquid in bore 30a increases. Likewise, if closed end 30a-2 is positioned above or at a higher elevation than open end 30a-1 (e.g., axis 35a slopes upward moving from end 30a-1 to 30a-2), any liquid that accumulates in bore 31a will flow under the force of gravity to open end 30a-1 and into meter passage 14. However, if closed end 30a-2 is positioned below or at a lower elevation than open end 30a-1 (e.g., axis 35a slopes downward moving from end 30a-1 to 30a-2), liquid that accumulates in bore 31a will not flow under the force of gravity to open end 30a-1 and into passage 14. If the liquid accumulation within bore 31a is sufficient, it may undesirably interfere with the transmission of acoustic signals along chord 22 between transducers 20a, 20b as shown in FIG. 1. However, in this embodiment, a liquid drainage system 50 is placed in fluid communication with transducer port 30a to drain accumulated liquid therefrom, thereby reducing the amount of accumulated liquid within bore 30a and reducing the potential for acoustic shorting.

Referring still to FIG. 4, in this embodiment, liquid drainage system 50 includes a drain hole or port 51 in fluid communication with transducer port 30a and a drain conduit 52 extending from drain port 51. Drain port 51 is a through bore extending radially (relative to axes 25a, 35a, 45a) through transducer housing 40a to transducer port 30a. In other embodiments where the transducer port (e.g., port 30a) extends through and is defined by the spool piece (e.g., spool piece 11), the drain port (e.g., drain port 51) may extend through a portion of the spool piece.

Drain port 51 is preferably positioned and oriented such that liquid within transducer port 30a will automatically drain under the force of gravity from transducer port 30a into drain port 51. In other words, drain port 51 is preferably positioned at the location at which liquid accumulates within transducer port 30a. Such location will ultimately depend on the position and orientation of flow meter 10 and transducer port 30a, but is typically at the relatively lower portions of the transducer port (i.e., those portions of the transducer port that are at a lower elevation than the open end of the transducer port).

Referring still to FIG. 4, drain conduit 52 has a first or inlet end 52a coupled to housing 40a and in fluid communication with drain port 51, and a second or outlet end 52b opposite inlet end 52a. Accumulated liquid within port 30a drains from transducer port 30a through drain port 51 and inlet end 52a into conduit 52, and exits conduit 52 through outlet end 52b. In this embodiment, a valve 53 is positioned along conduit 52 between ends 52a, 52b. Valve 53 controls the flow of drained liquid through conduit 52. In particular, when valve 53 is in an open position, drained liquid is free to flow through drain port 51, inlet end 52a, conduit 52, and valve 53 to outlet end 52b. However, when valve is in a closed position, drained liquid is restricted and/or prevented from flowing through valve 53 from inlet end 52a to outlet end 52b.

During normal operation of flow meter 10, valve 53 is preferably maintained in the closed position. Specifically, depending on the design of the flow meter (e.g., flow meter 10) and/or the drainage destination (e.g., location of outlet end 52b), liquid and/or gas flow through the drain conduit (e.g., conduit 52) may affect the acoustic signals moving to and from the corresponding transducer (e.g., transducer 20a), potentially resulting in flow measurement errors, particularly if some of the gas flowing through the meter body flows into the transducer port (e.g., port 30a) and through the drain port (e.g., drain port 51). However, when a malfunction of transducer 20a is detected by the electronics package 80, valve 53 is transitioned to the open position to drain any accumulated liquids in transducer port 30a that may have caused the transducer failure. Following drainage of transducer port 30a, valve 53 is transitioned back to the closed position to allow for accurate flow measurement. If accurate flow measurements do not return following the drainage of transducer port 30a and the closure of valve 53, it is likely that liquid accumulation in transducer port 30a did not cause of the transducer malfunction. In this manner, valve 53 may be used as a tool to troubleshoot malfunctioning transducer 20a.

In general, valve 53 may be any suitable type of valve including, without limitation, a manual valve, a ball valve, an electronically controlled valve, or combinations thereof. In this embodiment, an actuator 54 transitions valve 53 between the open and closed positions. In particular, actuator 54 is an electronically controlled solenoid, and thus, may also be referred to as solenoid 54. Valve 53 is biased to the closed position by solenoid 54, and transition valve 53 to the open position when solenoid 54 receives an electrical signal (e.g., a sufficient electric current). Thus, when solenoid 54 does not receive an electrical signal, or the received electrical signal is insufficient to operate solenoid 54, valve 53 remains in the closed position restricting and/or preventing fluid flow through conduit 52 between ends 52a, b.

Referring still to FIG. 4, in this embodiment, solenoid 54, and hence valve 53, are electronically controlled by electronics package 80, which directly communicates with solenoid 54 via a wire 55. In particular, the output electronics package 80 (e.g., voltage and/or current) directly actuates solenoid 54, thereby transitioning valve 53 between the open and closed position. However, as will be described in more detail below, in other embodiments, the electronics package (e.g., electronics package 80) may indirectly control the solenoid (e.g., solenoid 54) through one or more additional components. One example of an electronics package suitable for controlling solenoid 54 is the Mark III™ ultrasonic electronics package available from Daniel® Measurement and Control. The Mark III™ ultrasonic electronics package has several digital outputs that can be configured to deliver a relatively high voltage (~5 volt) or a relatively low voltage (~0 volt) to control solenoid 54.

Several conventional electronics packages for ultrasonic flow meters include the ability, via suitable hardware and software, to continuously monitor transducer chord paths and transducer signal validity during operation of the flow meter. Utilizing such capabilities, electronics package 80 continuously monitors transducer signal 22a generated and received by transducer 20a, and transitions valve 53 between the closed and open positions via solenoid 54 based on the validity of transducer signal 22a.

Figure 5:
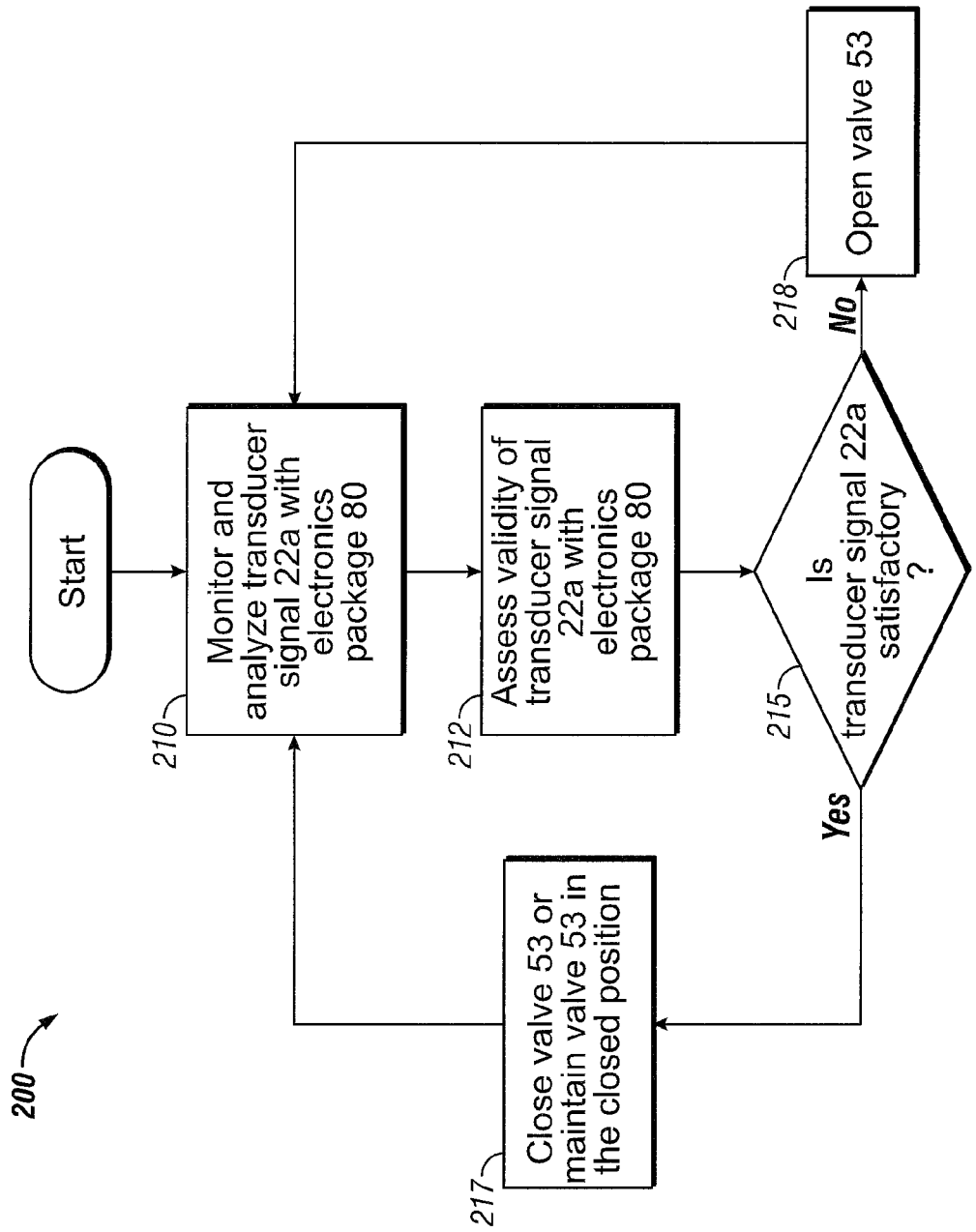
FIG. 5 is a flowchart illustrating an embodiment of a method for controlling the operation of the liquid drainage system of FIG. 4.

Referring now to FIG. 5, an embodiment of a method 200 for controlling valve 53 of drainage system 50 previously described based on the validity of transducer signal 22a is schematically shown. During operation of flow meter 10 to measure the flow rate of fluids through passage 14, transducer signal 22a is continuously monitored and analyzed by electronics package 80 in block 210. In addition, electronics package 80 assesses the validity of transducer signal 22a in block 212. If the validity of signal 22a is deemed satisfactory by electronics package 80 in block 215, the output of electronics package 80 to solenoid 54 is maintained at zero or a relatively low voltage (~0 volt), thereby maintaining valve 53 in the closed position according to block 217. However, when the validity of signal 22a is unsatisfactory by electronics package 80 in block 215, possibly due to liquid accumulation in transducer port 30a, the output of the electronics package 80 to solenoid 54 is switched to a relatively high voltage (~5 volt) sufficient to transition valve 53 from the closed position to the open position via solenoid 54 according to block 218. After valve 53 is opened in block 218, or closed or maintained in a closed position in block 217, the process repeats. Thus, as long as the validity of signal 22a monitored by electronics package 80 is unsatisfactory, the output of electronics package 80 is maintained at the relatively high voltage in order to maintain valve 53 in the open position and allow continued draining of liquid from port 30a. However, once validity of signal 22a monitored by electronics package 80 returns to satisfactory, the output of electronics package 80 to solenoid 54 is switched back to the relatively low voltage (~0 volt), thereby transitioning valve 53 back to the closed position according to block 217.

Figure 6:
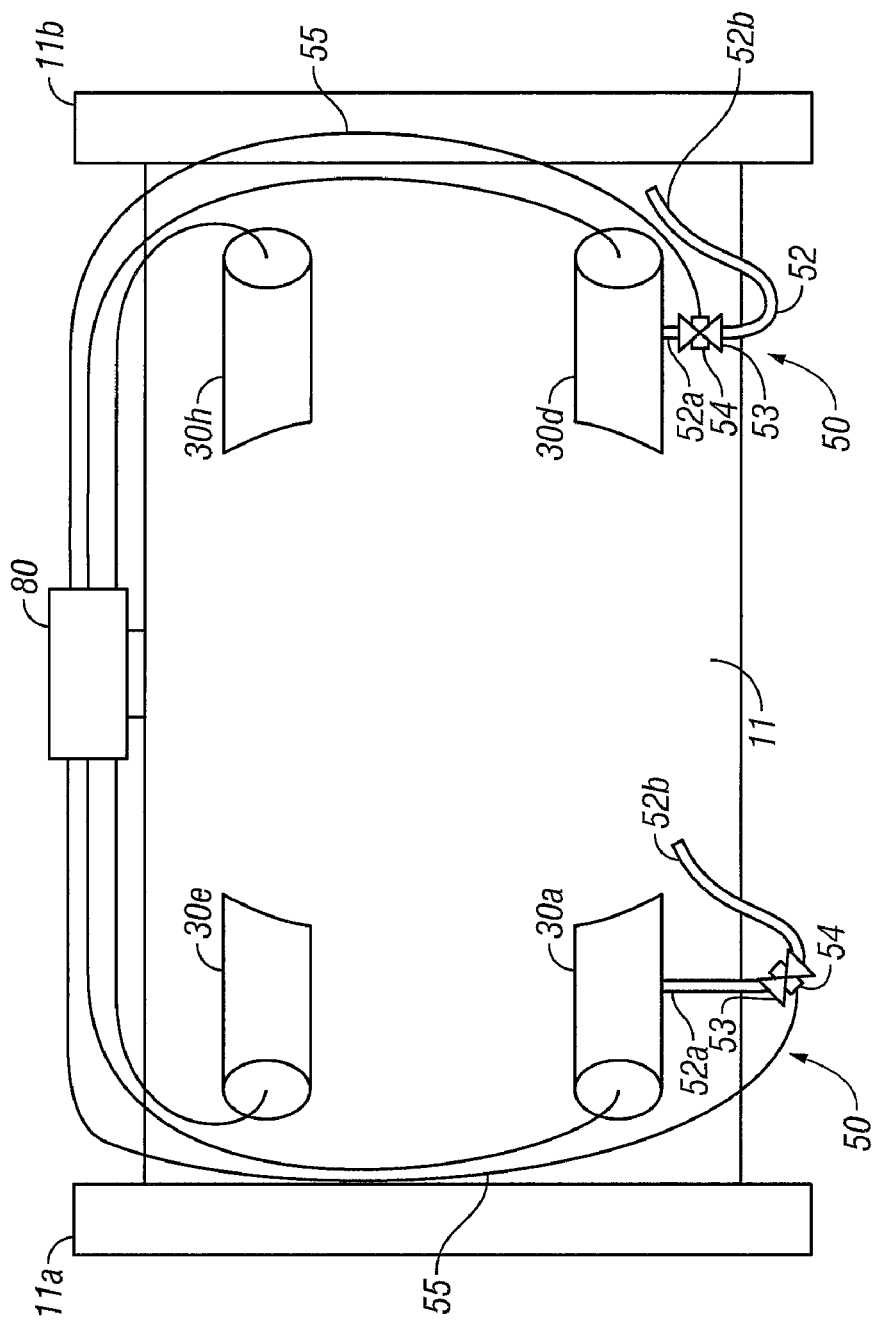
FIG. 6 is a side view of the ultrasonic flow meter of FIG. 1 with the outlet of the liquid drain conduit of the drainage system of FIG. 4 positioned to drain accumulated liquid back into the through passage of the flowmeter.
Figure 7:
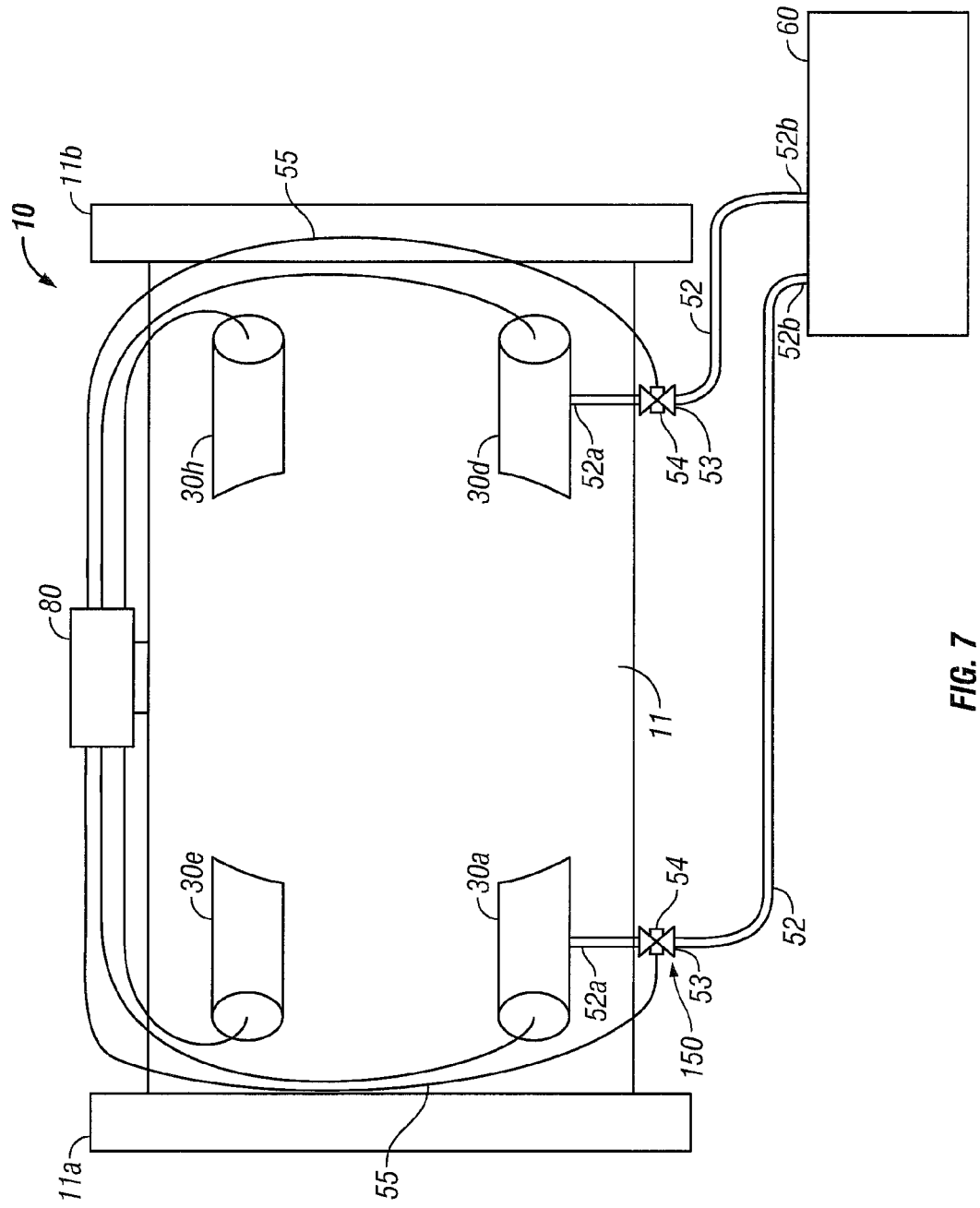
FIG. 7 is a partial side view of the ultrasonic flow meter of FIG. 1 with the outlet of the liquid drain conduit of the drainage system of FIG. 4 positioned to drain accumulated liquid into a storage vessel.

As previously described, outlet end 52b of conduit 52 may be positioned at any location suitable for discharging the drained liquid from port 30a. For example, in FIG. 6 outlet end 52b of each drain conduit 52 is coupled to spool piece 11 and placed in fluid communication with meter passage 14 downstream of its corresponding transducer port 30a, 30d. In the embodiment shown in FIG. 5, outlet end 52b is positioned to leverage the venturi effect resulting from the flow of fluid through passage 14, thereby generating a lower pressure at outlet end 52b relative to inlet end 52a that pulls drained liquid through conduit 52 to outlet end 52b and passage 14. Alternatively, as shown in FIG. 7, outlet end 52b may be coupled to and placed in fluid communication with a suitable liquid storage tank or vessel 60. The internal pressure within storage vessel 60 is preferably equal to or below the pressure in transducer port 30a. If the internal pressure of vessel 60 is less than the pressure within transducer port 30a, the pressure differential will pull the drained liquid from transducer port 30a, through drain conduit 52 to vessel 60. If, however, the internal pressure of vessel 60 is the same or close to the pressure in transducer port 30a, vessel 60 is preferably positioned at a lower elevation than transducer port 30a such that drained liquid will flow under the force of gravity alone from transducer port 30 through conduit 52 into storage vessel 60.

Figure 8:
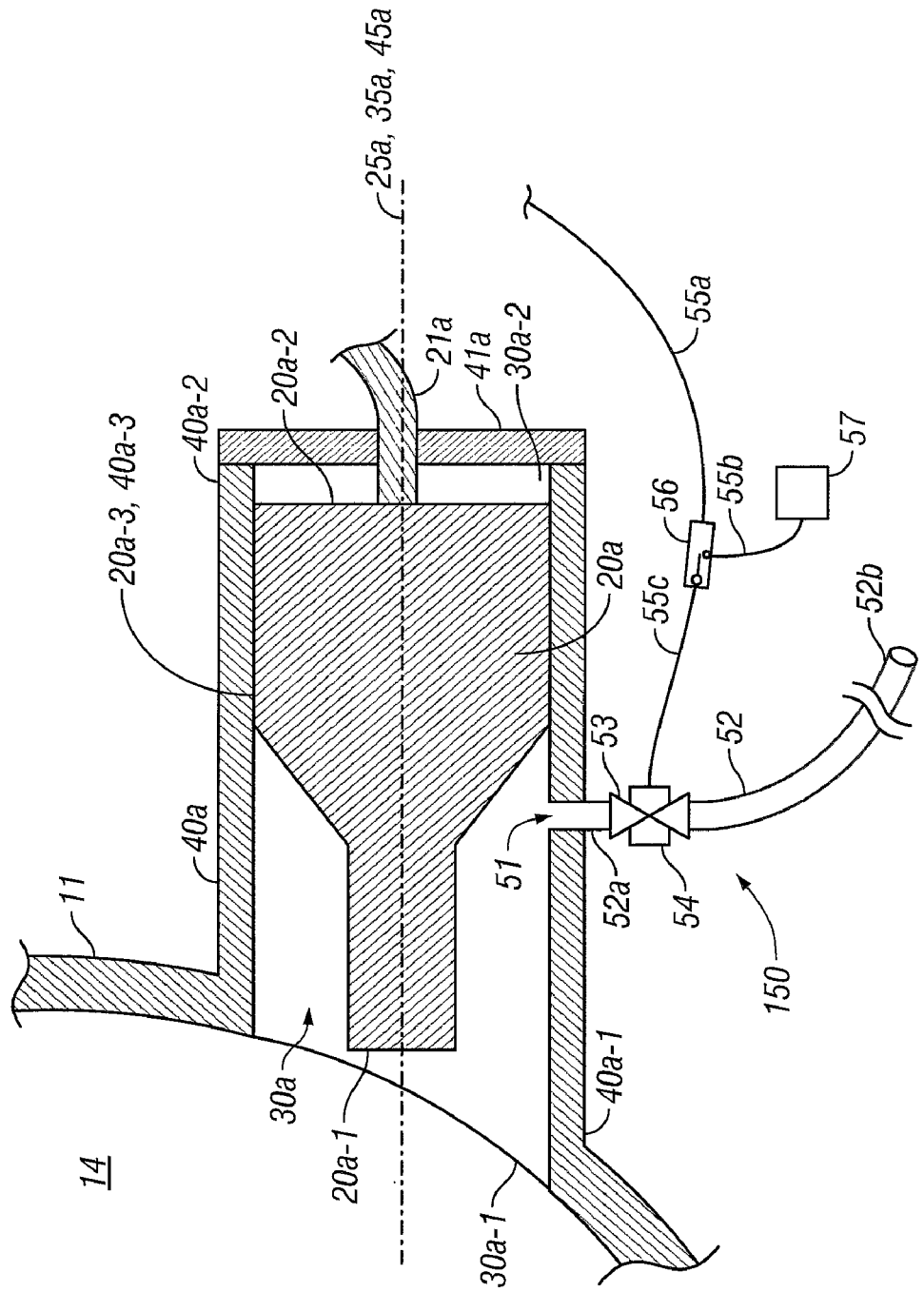
FIG. 8 is an enlarged partial cross-sectional view of an embodiment of a flow meter including an electronics package that indirectly controls a transducer port drainage system.

Referring now to FIG. 8, an embodiment of a liquid drainage system 150 for draining accumulated liquid from transducer port 30a of flow meter 10 is shown. Liquid drainage system 150 is similar to liquid drainage system 50 previously described. Namely, system 150 includes a drain port 51, conduit 52, valve 53, and valve control solenoid 54, each as previously described. Outlet end 52b of conduit 52 may be coupled to spool piece 11 downstream of port 30a as shown in FIG. 6 or coupled to a storage vessel (e.g., vessel 60) as shown in FIG. 7. However, in this embodiment, solenoid 54, and hence valve 53, is indirectly controlled by electronics package 80. In particular, in this embodiment, a relay switch 56 is positioned between electronics package 80 and solenoid 54, and an external power source or supply 57 is coupled to relay switch 56. In particular, a first wire 55a electrically couples electronics package 80 to relay switch 56, a second wire 55b electrically couples power supply 57 to relay switch 56, and a third wire 55c electrically couples relay switch 56 to solenoid 54. In other words, electronics package 80 communicates with one input of relay switch 56, power supply 57 supplies electrical power to a second input of relay switch 56, and relays switch 56 has an output that communicates with solenoid 54. Electronics package 80 controls whether relay switch 56 is open or closed. When relay switch 56 is closed, electrical power from power supply 57 passes through relay switch 56 to solenoid 54, and when relay switch 56 is open, electrical power from power supply 57 is prevented from passing through relays switch 56 to solenoid 54.

Electronic package 80 controls relay switch 56—when electronics package 80 outputs a relatively low voltage to relay switch 56, relay switch 56 remains open and the electrical signal provided by power supply 57 is prevented from passing through relay switch 56 to solenoid 55. However, when electronics package 80 outputs a relatively high voltage to relay switch 56, relay switch 56 closes and the electrical signal provided by power supply 57 is allowed to pass through relay switch 56 to solenoid 55, thereby actuating solenoid 54 and transitioning valve 53 from the closed position to the open position.

Drainage system 150 is operated in a similar manner as drainage system 50 previously described. Specifically, electronics package 80 continuously monitors and analyzes transducer signal 22a. In addition, electronics package 80 assesses the validity of signal 22a. When the validity of signal 22a is satisfactory, electronics package 80 outputs a relatively small voltage to relay switch 56, thereby maintaining relay switch 56 in the open position and maintaining valve 53 in the closed position. However, when the validity of signal 22a is unsatisfactory, electronics package 80 outputs a relatively high voltage to relay switch 56, thereby closing relay switch 56, allowing the electrical signal from power supply 57 to flow to solenoid 54, and transitioning valve 53 to the open position. Once the validity of signal 22a returns to satisfactory, electronics package 80 returns to a relatively low voltage output, thereby transitioning relay switch 56 back to the open position and preventing the electrical signal from power supply 57 from flowing to solenoid 54, and transitioning valve 53 back to the closed position. Embodiments disclosed herein including an external power source (e.g., external power supply 57) to actuate the valve solenoid (e.g., solenoid 54) are particularly preferred when the solenoid requires a voltage or current in excess of that which the ultrasonic meter electronics packages (e.g., electronics package 80) can provide.

Referring now to both FIGS. 4 and 8, the amount of time required to drain the liquid from transducer port 30a is preferably kept as short as possible so that valve 53 is not in the open position for an excessive period of time. To facilitate the desired time interval for which valve 53 is maintained in an open position, the output of the electronics package 80 in FIG. 4 is preferably regulated by a solenoid valve timer, and the output of relay switch 56 in FIG. 8 is preferably regulated by a solenoid valve timer. The solenoid valve timer may be integral with solenoid 54 or a separate component positioned between electronics package 80 and solenoid 54 in FIG. 4 and between relay switch 56 and solenoid 54 in FIG. 8. The solenoid valve timer includes an impulse feature that automatically triggers solenoid 54 to close valve 53 after a preset or predetermined period of time (e.g., 60 s). Specifically, the solenoid valve timer (a) allows solenoid 54 to transition valve 53 to the open position when solenoid 54 is energized by a relatively high voltage output (from electronics package 80 of FIG. 4 or relay switch 56 of FIG. 8); (b) maintains the solenoid valve 53 in the open position for the predetermined period of time; and (c) automatically triggers solenoid 54 to transition valve 53 back to the closed position after the predetermined period of time, regardless of the output of electronics package 80. The solenoid valve timer preferably does not allow solenoid 54 to transition valve 53 back to the open position until it is reset (i.e., the output of the electronics package 80 in FIG. 4 or the output of relay switch 56 in FIG. 8 returns to the relatively low voltage), and then re-energized by the relatively high voltage output. One example of a suitable solenoid valve timer is the SVT-1078A timer available from Omega™ Engineering, Inc. of Stamford, Conn.

In the manners described above, embodiments of liquid drainage systems described herein (e.g., system 50, system 150, etc.) may be configured for automatic control by electronics package 80, with either (a) electronics package 80 directly controlling solenoid 54, and hence valve 53 as shown in FIG. 4, or (b) indirectly controlling solenoid 54 and valve 53 via relay switch 56 as shown in FIG. 8. Electronics package 80 is preferably configured to transition solenoid valve 53 to the open position only when a problem has been detected (e.g., invalid acoustic signal 22a, etc.). Such automated control of the liquid drainage system eliminates the need for manual operation valve 53.

Although liquid drainage system 50 shown in FIG. 4 and drainage system 150 shown in FIG. 5 are each shown as being coupled to exemplary transducer port 30a, any one or more transducer port (e.g., ports 30a, 30b, 30c, 30d, etc.) may have its own drainage system or be tied into a common drainage system. However, at a minimum, a liquid drainage system (e.g., system 50 or system 150) for draining accumulated liquid is preferably provided for each transducer port that will not automatically drain back into the through passage of the spool piece (e.g., passage 14 of spool piece 11) under the force of gravity. Thus, transducer ports that are horizontal or that slope downward moving toward the through passage of the spool piece need not include a system for draining accumulated liquid. Identifying those transducer ports that should include a system for draining accumulated liquid will depend on the position and orientation of the flow meter, and may vary from application to application.

In flow meters having two or more transducer ports requiring periodic drainage of accumulated liquid, each transducer port to be drained is preferably in fluid communication with a drain port (e.g., drain port 51) and a liquid drain conduit (e.g., drain conduit 52) extending from the drain port. The drain conduits extending from the transducer ports may extend to a common destination or to different destinations. Further, the individual drain conduits may merge into a single downstream outlet line or remain separate in route to the destination. Further, a single valve (e.g., valve 53) may be provided for each drain port, or alternatively, a single valve may be provided for a plurality of drain ports. In embodiments where a valve is provided for each drain port, each valve is preferably controlled directly by the electronics package (e.g., electronics package 80) as shown in FIG. 4 or controlled indirectly by the electronics package as shown in FIG. 5. If multiple valves are indirectly controlled by the electronics package, each valve preferably includes its own dedicated valve timer and relay switch (e.g., relay switch 56). On the other hand, in embodiments where a single valve (e.g., valve 53) is provided for more than one drainage system, each drain conduit preferably merges into a single conduit that includes the valve. If such single valve is indirectly controlled by the electronics package, only one valve timer and one relay switch need be provided.

In embodiments including more than one transducer port having a drain port, drainage of the transducer ports is preferably independently controlled. For example, the electronics package (e.g., electronics package 80) may be configured to (a) continuously monitor, analyze, and assess each chord path (e.g., each path 22, 23, 24, 25) and each associated acoustic signal (e.g., each signal 22a, 23a, 24a, 25a), respectively, and, (b) identify signal failures (e.g., signal validity problems) and associated transducer ports, and (c) independently control the drainage of such transducer ports. Upon detection of a transducer signal failure, the electronics package initiates the draining of only those transducer port(s) associated with the failing transducer(s). For such independent monitoring and drainage of multiple transducer ports, the electronics package preferably includes multiple outputs (one for each drain port), and one valve is preferably provided for each drain port. In addition, for independent and indirect control of the valves, one valve timer and relay switch is preferably provided for each valve.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims.

What is claimed is:

1. An ultrasonic flow meter for measuring the flow of a fluid through a pipeline, comprising:
   a spool piece including a throughbore and a transducer port, wherein the transducer port extends along a central axis from an open end at the throughbore to a closed end distal the throughbore;
   an acoustic transducer disposed in the transducer port, wherein the transducer includes a piezoelectric element;
   a drain port in fluid communication with the transducer port, wherein the drain port is axially positioned between the open end and the closed end of the transducer port; and
   a drain conduit having an inlet end coupled to the drain port and an outlet end opposite the inlet end;
   wherein the drain port is configured to drain a liquid from the transducer port into the inlet end of the drain conduit.

2. The flow meter of claim 1, wherein the drain conduit includes a valve, wherein the valve has an open position allowing the liquid to flow through the valve and the drain conduit, and a closed position restricting the liquid through the valve and the drain conduit.

3. The flow meter of claim 2, further comprising an actuator adapted to actuate the valve between the open position and the closed position.

4. The flow meter of claim 3, wherein the actuator is a solenoid.

5. The flow meter of claim 3, further comprising an electronics package coupled to the actuator, wherein the electronics package is configured to control the actuator to transition the valve between the open position and closed position.

6. The flow meter of claim 3, wherein the actuator is configured to bias the valve to the closed position.

7. The flow meter of claim 3, further comprising a relay switch and a power supply;
   wherein the relay switch has a first input coupled to the electronics package, a second input coupled to the power supply, and an output coupled to the actuator;
   wherein the relay switch has a closed position allowing electrical power from the power supply to pass through the relay switch to the actuator, and an open position preventing electrical power from the power supply from passing through the relay switch to the actuator;
   wherein the electronic package is configured to transition the relay switch between the open position and the closed position.

8. The flow meter of claim 2, wherein the outlet end of the drain conduit is coupled to the spool piece and in fluid communication with the throughbore of the spool piece.

9. The flow meter of claim 2, further comprising a liquid storage vessel coupled to the outlet end of the drain conduit, wherein the drain conduit is configured to flow the liquid from the transducer port through the drain port to the liquid storage vessel.

10. A method for draining an accumulated liquid from a transducer port of an ultrasonic flow meter, the method comprising:
    (a) flowing a fluid through a throughbore in the flow meter, wherein the transducer port extends from the throughbore and is in fluid communication with the throughbore;
    (b) communicating an acoustic signal across a throughbore of the flow meter with a transducer disposed in the transducer port;
    (c) accumulating a liquid in the transducer port during (a);
    (d) draining the accumulated liquid in the transducer port through a drain port in fluid communication with the transducer port after (c);
    (e) flowing the liquid from the drain port into a drain conduit during (d);
    (f) biasing a valve in the drain conduit to a closed position restricting the liquid from flowing through the valve; and
    (g) transitioning the valve to an open position after (c) to allow the liquid to flow through the valve.

11. The method of claim 10, further comprising:
    (h) transitioning the valve back to the closed position after (g).

12. The method of claim 11, wherein an actuator coupled to the valve biases the valve to the closed position in (f) and transitions the valve between the open position and the closed position in (g) and (h).

13. The method of claim 11, further comprising:
    monitoring the acoustic signal with an electronics package;
    determining the validity of the acoustic signal with the electronics package;
    maintaining the valve in the closed position with the electronics package when the acoustic signal is determined to be valid;
    transitioning the valve to the open position in (g) with the electronics package when the acoustic signal is determined to be invalid.

14. The method of claim 13, further comprising:
    transitioning the valve back to the closed position in (h) with the electronics package when the acoustic signal is determined to be valid.

15. The method of claim 13, further comprising:
    closing a relay switch with the electronics package to transition the valve to the open position in (g);
    opening the relay switch with the electronics package to transition the valve to the closed position in (h).

16. The method of claim 14, further comprising:
transitioning the valve back to the closed position in (h) after a predetermined period of time.

17. The method of claim 10, further comprising:
flowing the liquid through the drain conduit into the throughbore of the flow meter, or flowing the liquid through the drain conduit into a liquid storage vessel.

18. A method for identifying a malfunctioning acoustic transducer in an ultrasonic flow meter, the method comprising:
(a) flowing a fluid through a throughbore of the flow meter;
(b) sending an acoustic signal across a throughbore of the flow meter with an acoustic transducer disposed in a transducer port extending from a throughbore in the flow meter;
(c) receiving an acoustic signal passing across the throughbore of the flow meter with the acoustic transducer;
(d) providing a drain port in fluid communication with the transducer port, wherein a drain conduit coupled to the drain port includes a valve;
(e) continuously monitoring the acoustic signals with an electronics package coupled to the transducer;
(f) determining the validity of the acoustic signals with the electronics package during (e);
(g) maintaining the valve in the closed position with the electronics package when the acoustic signal is determined to be valid in (f);
(h) transitioning the valve to the open position in (g) with the electronics package when the acoustic signal is determined to be invalid in (f).

19. The method of claim 18, further comprising:
(i) transitioning the valve back to the closed position after (h);
(j) determining the validity of the acoustic signals with the electronics package after (i).

20. The method of claim 19, wherein (i) comprises transitioning the valve back to the closed position after a predetermined period of time.

* * * * *